United States Patent
Hornbach et al.

(10) Patent No.: US 9,638,061 B2
(45) Date of Patent: May 2, 2017

(54) STANDARD BEARING UNIT

(75) Inventors: Johannes Hornbach, Frankenthal (DE); Claus Oberste-Brandenburg, Gau-Odernheim (DE)

(73) Assignee: BorgWarner Inc., Auburn Hills, MI (US)

( * ) Notice: Subject to any disclaimer, the term of this patent is extended or adjusted under 35 U.S.C. 154(b) by 613 days.

(21) Appl. No.: 14/235,524

(22) PCT Filed: Jul. 24, 2012

(86) PCT No.: PCT/US2012/047928
§ 371 (c)(1),
(2), (4) Date: Jan. 28, 2014

(87) PCT Pub. No.: WO2013/019471
PCT Pub. Date: Feb. 7, 2013

(65) Prior Publication Data
US 2014/0140840 A1 May 22, 2014

(30) Foreign Application Priority Data
Aug. 4, 2011 (DE) .................. 10 2011 109 448

(51) Int. Cl.
*F01D 25/16* (2006.01)
*F16C 43/00* (2006.01)
(52) U.S. Cl.
CPC .......... *F01D 25/16* (2013.01); *F01D 25/162* (2013.01); *F16C 43/00* (2013.01); *F05D 2220/40* (2013.01); *F05D 2230/52* (2013.01); *F05D 2240/50* (2013.01); *Y10T 29/49696* (2015.01)

(58) Field of Classification Search
CPC .... F01D 25/16; F01D 25/162; F05D 2220/40; F05D 2230/52; F05D 2240/50; F16C 43/00
See application file for complete search history.

(56) References Cited

U.S. PATENT DOCUMENTS

| | | | | |
|---|---|---|---|---|
| 3,993,370 A | * | 11/1976 | Woollenweber | F01D 25/166 384/287 |
| 4,676,717 A | * | 6/1987 | Willyard, Jr. | F01D 9/026 29/402.08 |
| 4,694,689 A | | 9/1987 | Kawasaki | |
| 4,902,144 A | * | 2/1990 | Thoren | F01D 25/166 384/287 |
| 4,927,336 A | | 5/1990 | Rossmann et al. | |
| 5,562,349 A | * | 10/1996 | Nespodzany, Jr. | F16C 19/525 384/493 |

(Continued)

OTHER PUBLICATIONS

International Search Report PCT/US2012/047928, Dec. 10, 2012.

*Primary Examiner* — Igor Kershteyn
(74) *Attorney, Agent, or Firm* — A. Michael Tucker; Stephan A. Pendorf; Patent Central LLC

(57) ABSTRACT

A standard bearing unit (1) for different exhaust-gas turbocharger designs (8), having a shaft (2); having a shaft nut (18); having sealing devices (14, 15); having a compressor wheel (3) which is arranged on a first end (4) of the shaft (2); and having a turbine wheel (5) which is arranged on a second end (6) of the shaft (2), wherein the shaft (2) is mounted in a standardized bearing sleeve (7) which has predefined, unchangeable outer dimensions (19, 23) which are independent of the exhaust-gas turbocharger embodiment.

5 Claims, 3 Drawing Sheets

(56) References Cited

U.S. PATENT DOCUMENTS

| | | | | |
|---|---|---|---|---|
| 6,017,184 A | * | 1/2000 | Aguilar | F01D 25/168 |
| | | | | 415/105 |
| 7,189,005 B2 | * | 3/2007 | Ward | F01D 25/166 |
| | | | | 384/286 |
| 2007/0206889 A1 | | 9/2007 | Obara et al. | |
| 2011/0176907 A1 | | 7/2011 | Groves et al. | |

* cited by examiner

STANDARD BEARING UNIT

BACKGROUND OF THE INVENTION

Field of the Invention

The invention relates to a standard bearing unit that can be used in different exhaust-gas turbocharger designs.

Description of the Related Art

The balancing of a core assembly which is formed by the bearing housing and by all of the parts mounted therein is work-intensive and expensive in particular owing to the adaptation of the devices of the balancing system to the large number of variants of the bearing housing ports and oil ports of an exhaust-gas turbocharger, and constitutes a time-consuming working step during the assembly process of the exhaust-gas turbocharger because every core assembly, after balancing, enters with the physically identical parts into the final assembly process of the exhaust-gas turbocharger.

It is therefore an object of the present invention to provide a standard bearing unit which makes it possible for the rotor to be balanced with little outlay in order thereby to simplify the assembly process for an exhaust-gas turbocharger.

BRIEF SUMMARY OF THE INVENTION

According to the invention, a standard bearing unit is formed which is independent of the respective application (geometry of the bearing housing), because the rotor to be balanced, composed of shaft, shaft nut, bearing bushings, seal and spacer elements, compressor wheel and turbine wheel, can be mounted in a standardized bearing sleeve with fixedly predefined outer dimensions (diameter and length) and balanced in a bearing housing which is a constituent part of the balancing machine. In this way, it is possible firstly for a standard bearing unit which is predefined with fixed dimensions to be combined with different customer-specific bearing housings at the final assembly stage, specifically independently of their oil port position and water cooling arrangement outlet position and independently of the compressor housing and turbine housing connections. To allow for all possible applications, it is secondly also possible for the standard bearing unit, while having the same outer dimensions, to be provided with different rotor components.

The invention further concerns a method for mounting a standard bearing unit according to the invention into an exhaust-gas turbocharger bearing housing.

BRIEF DESCRIPTION OF THE SEVERAL VIEWS OF THE DRAWINGS

Further details, features and advantages of the invention will emerge from the following description of exemplary embodiments of the invention on the basis of the drawing, in which.

DETAILED DESCRIPTION OF THE INVENTION

Figure 1:
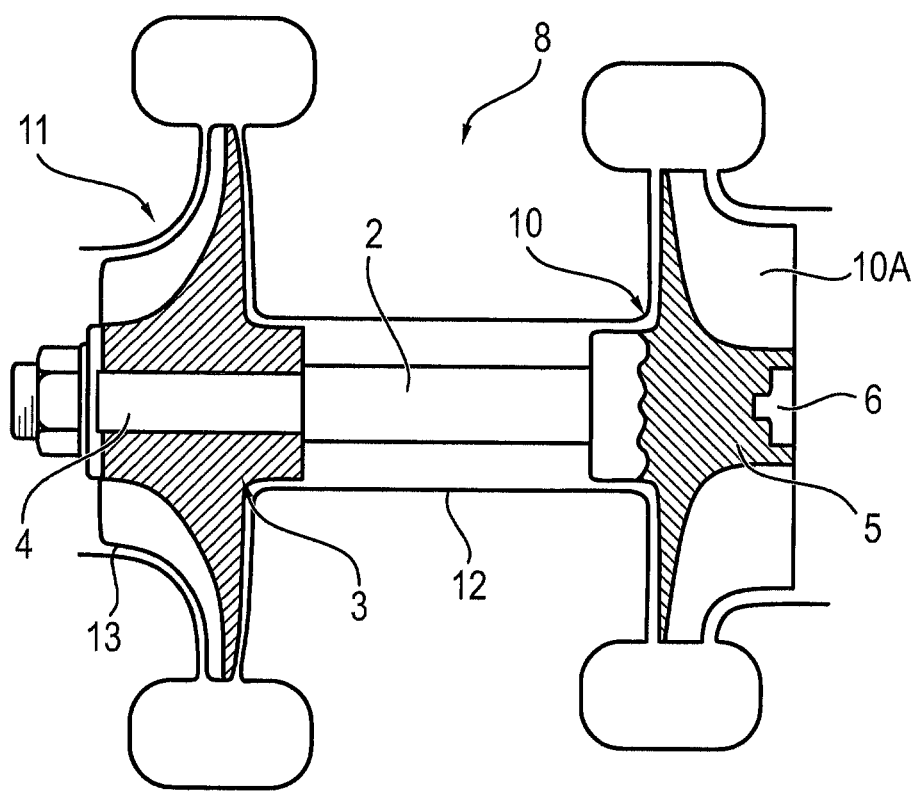
FIG. 1 shows a diagrammatic illustration of an exhaust-gas turbocharger.

FIG. 1 illustrates an exhaust-gas turbocharger 8 which can be provided with a standard bearing unit according to the invention, which will be described below. The exhaust-gas turbocharger 8 has a turbine 9 with a turbine wheel 5 in a turbine housing 10. The turbine wheel 5 is connected to a shaft 2 which, at its opposite end, bears a compressor wheel 3 of a compressor 11 which is arranged in a compressor housing 13.

The shaft 2 is mounted in a bearing housing 12 which is illustrated merely in very schematically highly simplified form in FIG. 1.

Figure 2:
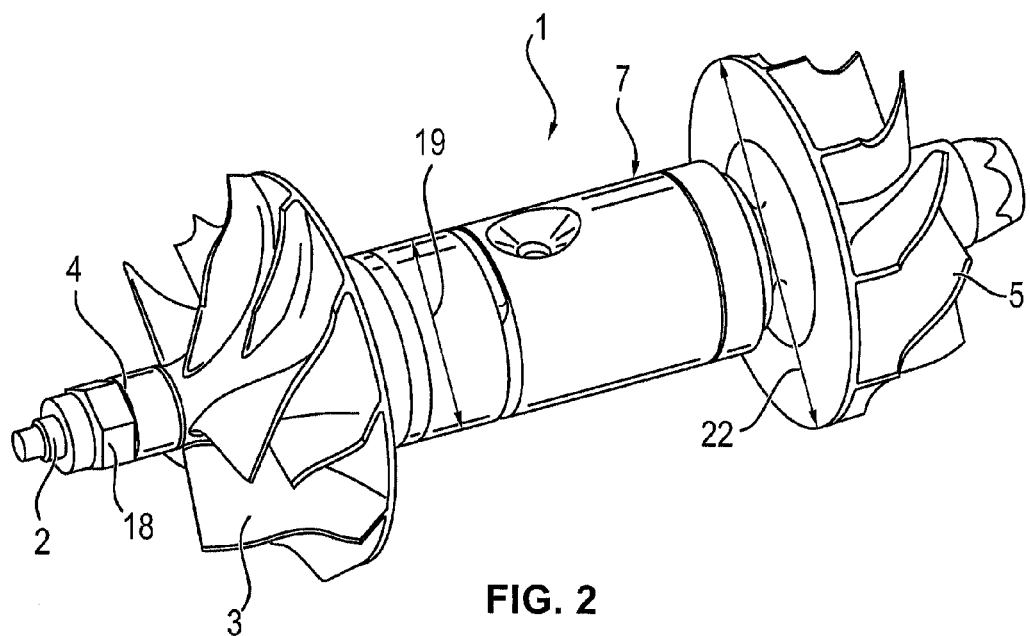
FIG. 2 shows a perspective illustration of a standard bearing unit according to the invention.
Figure 3:
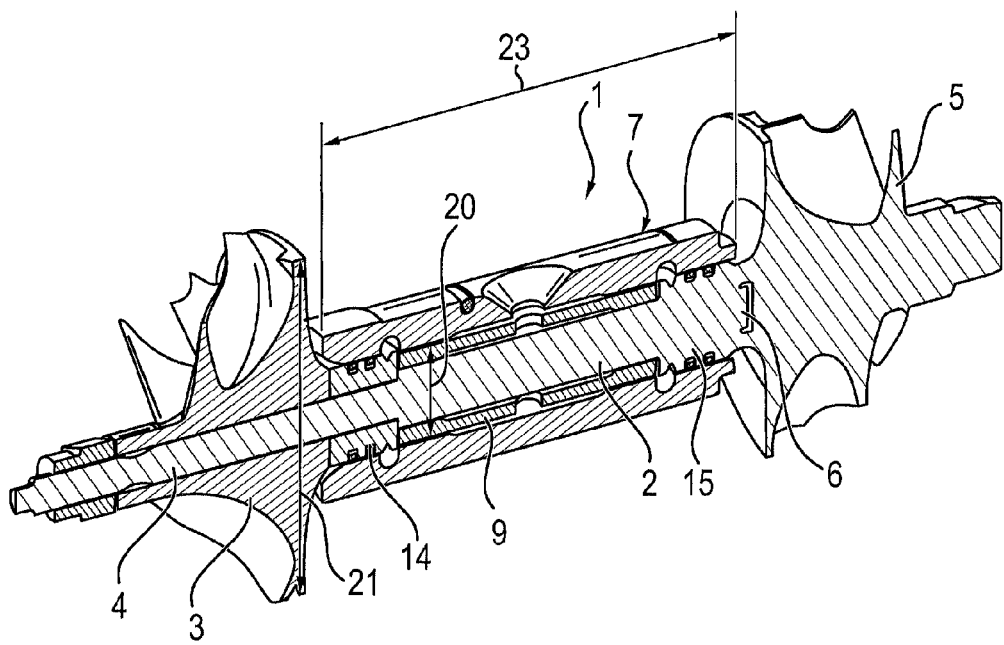
FIG. 3 shows the standard bearing unit as per FIG. 2 in a longitudinal section.

Viewing FIGS. 2 and 3 together, it is possible to see the design of an embodiment of a standard bearing unit 1 according to the invention which can be used in the exhaust-gas turbocharger 8 as per FIG. 1. The standard bearing unit 1 has the shaft 2 which is provided at a first end 4 with the compressor wheel 3 and which is connected at its second end 6 to the turbine wheel 5.

The shaft 2 is arranged in a standardized bearing sleeve 7 in which, as per the illustration of FIGS. 2 and 3, is arranged at least one bearing bushing 9 for guiding the shaft 2. Furthermore, the sectional illustration of FIG. 3 shows two seal devices 14 and 15 for sealing off the bearing sleeve 7.

As a result of said design, a uniform standard bearing unit 1 is provided which can be mounted into a split bearing housing of a balancing machine (not illustrated) and balanced. Consequently, a balanceable standard bearing unit is provided which has the respective wheel pairs 3 and 5 which can be balanced independently of the final assembly process and respective application.

Figure 4:
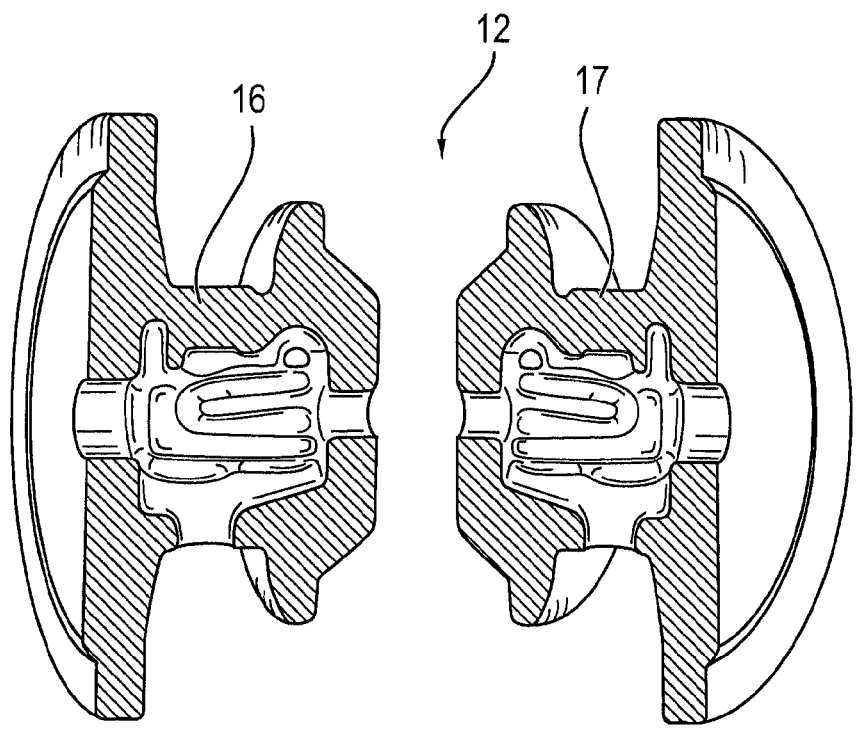
FIG. 4 shows two bearing housing halves in the unprocessed state.
Figure 5:
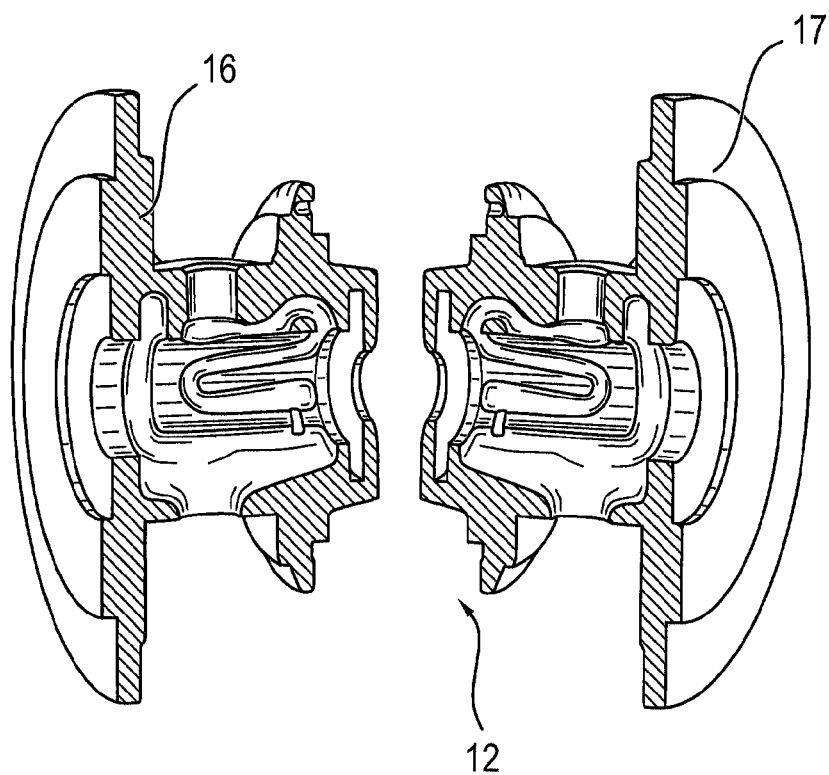
FIG. 5 shows the bearing housing halves 11 as per FIG. 4 in the finished machined state.

FIGS. 4 and 5 illustrate bearing housing halves 16 and 17 of the bearing housing 12 according to the invention. Here, FIG. 4 shows the unprocessed state of the bearing housing halves 16 and 17, whereas FIG. 5 shows the finished machined state of the bearing housing halves 16 and 17.

In addition to the vertical division of the bearing housing 12 as illustrated in FIGS. 4 and 5, horizontal division is also possible.

If the standard bearing unit 1 described in detail with regard to FIGS. 2 and 3 is to be mounted in the bearing housing 12, the two bearing housing halves 16 and 17 are firstly produced.

Before or after said production process, the shaft 2, the compressor wheel 3, the turbine wheel 5 and the bearing sleeve 7, if appropriate with the bearing bushing 9 arranged therein, are preassembled to form a balanceable standard bearing unit.

Said standard bearing unit can be balanced and subsequently mounted into the two housing halves 16 and 17, whereafter the housing halves 16 and 17 are subsequently sealed off.

In addition to the written disclosure of the invention above, reference is hereby made explicitly to the diagrammatic illustration of the invention in FIGS. 1 to 5.

LIST OF REFERENCE SYMBOLS

1 Standard bearing unit
2 Shaft
3 Compressor wheel
4 First end of the shaft 2
5 Turbine wheel
6 Second end of the shaft 2
7 Bearing sleeve
8 Exhaust-gas turbocharger
9 Bearing bushing
10 Turbine
10A Turbine housing
11 Compressor 12 Bearing housing
13 Compressor housing
14, 15 Sealing devices
16, 17 Bearing housing halves
18 Shaft nut
19 Outer diameter of the bearing sleeve
20 Bore diameter of the bearing sleeve
21, 22 Compressor wheel/turbine wheel diameter
23 Length of the bearing sleeve

The invention claimed is:

1. A family of turbochargers, comprising
bearing units (1), each bearing unit (1) having
- a shaft (2) having a shaft axis;
- a shaft nut (18);
- sealing devices (14, 15);
- a compressor wheel (3) which is arranged on a first end (4) of the shaft (2);
- a turbine wheel (5) which is arranged on a second end (6) of the shaft (2); and
- a bearing sleeve (7) in which the shaft (2) is rotatably mounted, the bearing sleeve (7) having generally cylindrical circumferential dimensions, bearing housings (12), each bearing housing defining a bore (20) for receiving one of said bearing units, each bearing housing divided parallel to the shaft axis into a first half (16) and a second half (17), wherein separation of the bearing housing into said first half (16) and second half (17) exposes the bore (20) such that one of said bearing units (1) can be introduced into or removed from said bore (20), wherein each bearing unit (1) in the family of turbochargers has the same circumferential dimensions (19), wherein each bearing housing (12) in the family of turbochargers has bore (20) dimensions complementary to the bearing unit circumferential dimensions (19).

2. The family of turbochargers as claimed in claim 1, wherein at least one bearing bushing (9) is arranged in the bearing sleeve (7).

3. The family of turbochargers as claimed in claim 1, wherein at least two the bearing sleeves (7), while having the same outer circumferential dimensions (19), have different bore diameters (20).

4. The family of turbochargers as claimed in claim 1, wherein at least two of the bearing units (1) support compressor wheels and/or turbine wheels with different compressor wheel and/or turbine wheel diameters (21, 22).

5. A method for assembling a bearing housing (12) and bearing unit (1) of the family of turbochargers of claim 1, the method comprising
- preassembling the shaft (2), the compressor wheel (3), the shaft nut (18), the sealing devices (14, 15), the turbine wheel (5) and the bearing sleeve (7) to form a balanceable bearing unit (1);
- installing the bearing unit (1) into a split bearing housing of a balancing machine;
- balancing the standard bearing unit in the balancing machine;
- removing the bearing unit (1) from the balancing machine as an intact balanced unit,
- separating the exhaust-gas turbocharger bearing housing (12) into a first half (16) and a second half (17),
- mounting the bearing unit (1) in the bearing housing (12), and
- mounting and sealing off the bearing housing halves (16, 17) on the bearing housing (12).

* * * * *